(12) United States Patent
Ruan

(10) Patent No.: US 10,746,251 B2
(45) Date of Patent: Aug. 18, 2020

(54) LOAD DAMPING ASSEMBLY WITH GAPPING FEATURE

(71) Applicant: ITT Manufacturing Enterprises LLC, Wilmington, DE (US)

(72) Inventor: Shubin Ruan, Williamsville, NY (US)

(73) Assignee: ITT Manufacturing Enterprises LLC, Wilmington, DE (US)

(*) Notice: Subject to any disclaimer, the term of this patent is extended or adjusted under 35 U.S.C. 154(b) by 109 days.

(21) Appl. No.: 15/977,005

(22) Filed: May 11, 2018

(65) Prior Publication Data

US 2019/0346007 A1 Nov. 14, 2019

(51) Int. Cl.
*F16F 9/48* (2006.01)
*E01D 19/00* (2006.01)
(Continued)

(52) U.S. Cl.
CPC ............ *F16F 9/48* (2013.01); *E01D 19/00* (2013.01); *E04B 1/98* (2013.01); *F16F 9/19* (2013.01); *F16F 9/20* (2013.01); *F16F 9/3214* (2013.01); *F16F 9/368* (2013.01); *F16F 9/369* (2013.01); *F16F 13/06* (2013.01); *F16F 15/022* (2013.01); *F16F 15/023* (2013.01); *E01D 11/00* (2013.01); *F16F 9/435* (2013.01); *F16F 2222/12* (2013.01); *F16F 2228/066* (2013.01);
(Continued)

(58) Field of Classification Search
CPC ...... F16F 9/19; F16F 9/20; F16F 9/368; F16F 9/369; F16F 9/3214; F16F 15/022; F16F 15/023; F16F 13/06; F16F 9/48; E01D 19/00; E04B 1/98
See application file for complete search history.

(56) References Cited

U.S. PATENT DOCUMENTS 3,171,643 A * 3/1965 Roos ............... F16F 9/0209
267/64.15
3,363,894 A * 1/1968 Hill ................. F16F 9/06
267/64.15
(Continued)

FOREIGN PATENT DOCUMENTS

JP H01-320341 A 12/1989
JP 2015-010377 A 1/2015
JP 2017-166173 A 9/2017

OTHER PUBLICATIONS

International Search Report and Written Opinion for PCT/US2019/031700; dated Aug. 22, 2019; 16 pages.
(Continued)

*Primary Examiner* — Vishal R Sahni
(74) *Attorney, Agent, or Firm* — Barclay Damon LLP

(57) ABSTRACT

A damping assembly for a structure includes a housing with a first fixed end and a second movable opposite end. A first translatable portion of the housing is slidably movable relative to an adjacent second section of the housing, the former being fixedly secured to a base when the structure is under load. A viscous damper disposed within the housing is engaged only after the first translatable section has first moved beyond an initial predetermined distance indicative of a higher amplitude loading event. At least one biasing feature prevents the viscous damper from operating until the first translatable section has first moved beyond the initial predetermined distance.

13 Claims, 4 Drawing Sheets

(51) Int. Cl.

| | | |
|---|---|---|
| *E04B 1/98* | (2006.01) | |
| *F16F 9/19* | (2006.01) | |
| *F16F 9/20* | (2006.01) | |
| *F16F 9/32* | (2006.01) | |
| *F16F 9/36* | (2006.01) | |
| *F16F 13/06* | (2006.01) | |
| *F16F 15/02* | (2006.01) | |
| *F16F 15/023* | (2006.01) | |
| *E01D 11/00* | (2006.01) | |
| *F16F 9/43* | (2006.01) | |

(52) U.S. Cl.
CPC ... *F16F 2230/0023* (2013.01); *F16F 2230/06* (2013.01); *F16F 2230/30* (2013.01); *F16F 2232/08* (2013.01)

(56) References Cited

U.S. PATENT DOCUMENTS

| | | | |
|---|---|---|---|
| 3,483,798 A * | 12/1969 | Parrett | F15B 15/16 91/169 |
| 3,656,014 A | 4/1972 | Rich | |
| 3,998,302 A * | 12/1976 | Schupner | F16F 9/44 188/285 |
| 4,191,092 A * | 3/1980 | Farmer | B66F 9/08 91/168 |
| 4,605,106 A | 8/1986 | Fyfe et al. | |
| 5,220,706 A * | 6/1993 | Bivens | E05F 3/02 16/66 |
| 5,249,783 A | 10/1993 | Davis | |
| 5,349,712 A | 9/1994 | Kawashima et al. | |
| 5,595,539 A | 1/1997 | Yamamoto | |
| 6,116,140 A * | 9/2000 | Barthalow | F15B 15/16 91/167 R |
| 6,292,967 B1 | 9/2001 | Tabatabai et al. | |
| 6,394,242 B1 | 5/2002 | Allaei | |
| 6,510,660 B1 | 1/2003 | Michioka et al. | |
| 7,281,704 B2 * | 10/2007 | Salice | E05F 5/02 188/297 |
| 7,743,563 B2 | 6/2010 | Hilmy | |
| 7,774,996 B2 | 8/2010 | Mualla | |
| 7,845,478 B2 | 12/2010 | Picot | |
| 8,087,500 B2 | 1/2012 | Iemura et al. | |
| 8,127,904 B2 | 3/2012 | Muska | |
| 8,844,205 B2 | 9/2014 | Michael et al. | |
| 9,021,751 B2 | 5/2015 | Yakoub | |
| 9,945,441 B2 | 4/2018 | Ogawa | |
| 2007/0114103 A1* | 5/2007 | Born | F16F 9/0218 188/284 |
| 2009/0133338 A1 | 5/2009 | Thompson et al. | |
| 2010/0059321 A1* | 3/2010 | Boivin | F16F 9/065 188/284 |
| 2013/0085607 A1 | 4/2013 | Ladra et al. | |
| 2013/0104467 A1 | 5/2013 | Yamao et al. | |
| 2014/0223841 A1 | 8/2014 | Aujaghian | |
| 2015/0192187 A1* | 7/2015 | Smith | F16F 9/22 188/284 |

OTHER PUBLICATIONS

Taylor Devices, Inc.; History, Design and Applications of Fluid Dampers in Structural Engineering; Douglas P. Taylor, President; http://taylordevices.com/papers/history/design.htm; 25 pgs.

* cited by examiner

LOAD DAMPING ASSEMBLY WITH GAPPING FEATURE

TECHNICAL FIELD

This application is generally related to the field of structural damping and more specifically to a damping assembly for a suspension bridge or similar supporting structure that frequently encounters small service loads that do not require damping. The damping assembly compensates for these loads, while still enabling damping when larger magnitude loads, such as seismic loads, are imparted to the supporting structure.

BACKGROUND

In certain supporting structures, such as suspension bridges, fairly small service loads and deflections of the structure are routinely and frequently encountered, these service loads having fairly small amplitudes. There is typically no need to provide damping for these service loads, wherein the structure should be permitted to move in response to same. However, there is still a need or requirement to provide damping for larger and more significant loads, such as seismic loads or high amplitude loads, that could be imparted to the supporting structure.

The frequent application of lower amplitude service loads in known damping assemblies for these supporting structures create issues due to fatigue upon the sealing elements of the dampers used given the overall number of cycles, thereby leading to premature failures that require replacement of these assemblies.

BRIEF DESCRIPTION

Therefore and according to a first aspect, there is provided a damping assembly for a supporting structure. The damping assembly comprises a housing having a first section that is attached to one end to the structure, the first section being translatably movable when a load is imparted to the structure relative to a fixed second end of the housing that is attached to a fixed support. A second section of the housing retains a viscous damper, such as a hydraulic damper, that is engaged only after an applied load has exceeded a predetermined value and the first section has first moved or translated a predetermined distance.

In one version, the viscous damper can include a reciprocating hydraulic assembly including a movable piston head and a piston rod each disposed within the housing. Sealed fluidic chambers are created on opposing sides of the piston head wherein movement of the sliding mechanism of the damping assembly can proceed upon application of a load. An internal resistive or biasing mechanism prevents movement of the piston head until a predetermined force has first been exceeded that is significantly greater than the force that permits initial movement of the sliding mechanism. Once the predetermined force is exceeded, the piston head is then enabled within the assembly to move hydraulic fluid under load and enable damping/flow of the contained hydraulic fluid between the sealed chambers as the piston head is caused to move through the fluid. According to one version, the internal resistive mechanism can include at least one sealing member that induces a sufficient biasing force against the interior of the housing to resist movement of the piston head until the first section has first moved the initial predetermined distance.

According to another aspect, there is provided a method for damping a supporting structure in which a first part of the damping assembly is attached to the supporting structure with an opposing end of the damping assembly being attached to a fixed support. Under an applied load, the first part of the damping assembly is initially allowed to move a predetermined distance without damping the structure. According to this method, a contained viscous damper is subsequently engaged only after the first part of the damping assembly has initially moved the predetermined distance to therein provide damping to the supporting structure. According to one version, the viscous damper is a hydraulic damper and in which at least one biasing feature is provided to prevent the viscous damper from operating until the first part of the assembly has first moved the predetermined distance.

According to at least one version, the assembly can include a first sleeve portion, a second sleeve portion and a third portion in which the first sleeve portion has a diameter that allows the first sleeve portion to slide over an exterior surface of the second sleeve portion and the second sleeve portion has a diameter that allows the second sleeve portion to slide over an exterior surface of the third sleeve portion. The movable piston is disposed within an interior of the second sleeve portion and in which the first part of the damping assembly includes at least the first sleeve portion.

The at least one biasing feature prevents movement of the piston head within the assembly until the predetermined amount of force has been applied and the first sleeve portion has moved over its predetermined range toward the second sleeve portion. According to one version, the biasing feature is a sealing member disposed in relation to the exterior of the piston head, in which the sealing member is configured to engage the interior wall of the housing.

One advantage realized by the herein described damping assembly is that small amplitude loads (service loads) that are usually and regularly imparted to a structure, such as a suspension bridge or other related structure, can be easily accommodated without prematurely engaging the damper. As a result there is no premature fatiguing of the damper seals, wherein the effective service life of the damping assembly can be maintained.

Another advantage realized is that a "gapping" functionality is herein provided by the described damping assembly in order to accommodate frequent small amplitude loads of a supporting structure without damping. This functionality can be easily incorporated into a single assemblage without significantly impacting manufacturing costs and expense of the damping assembly.

Still another advantage is that the gapping features of the herein described damping assembly can be suitably tuned or adjusted in order to delay active damping by the assembly as needed, thereby providing considerable versatility in regard to the overall design and uses therefor.

These and other features and advantages will be readily apparent from the following Detailed Description, which should be read in conjunction with the accompanying drawings.

DETAILED DESCRIPTION

The following description relates to a structural damper or damping assembly that is configured to accommodate relatively low amplitude (i.e., service) loads to be imparted to a structure, such as a suspension bridge, without damping, but in which significantly larger loads greater than a predetermined value that are imparted to the structure can be effectively damped. Throughout the course of this description, several terms are frequently used in order to provide a suitable frame of reference when referring to the accompanying drawings. However, it should be noted that the use of these terms, which include "inner", "outer", "exterior", "interior", "above", "below", "distal", "proximal", "inside", and "outside", among others, are not intended to significantly impact the intended scope of the invention, including the claims, unless where so expressly indicated.

The terms "comprising", "comprises", "comprise" and the terms "including", "includes", "include" and 'included", as used in the following description are intended to be synonymous, wherein each term is commonly intended refer to non-inclusive relationships.

Figure 1:
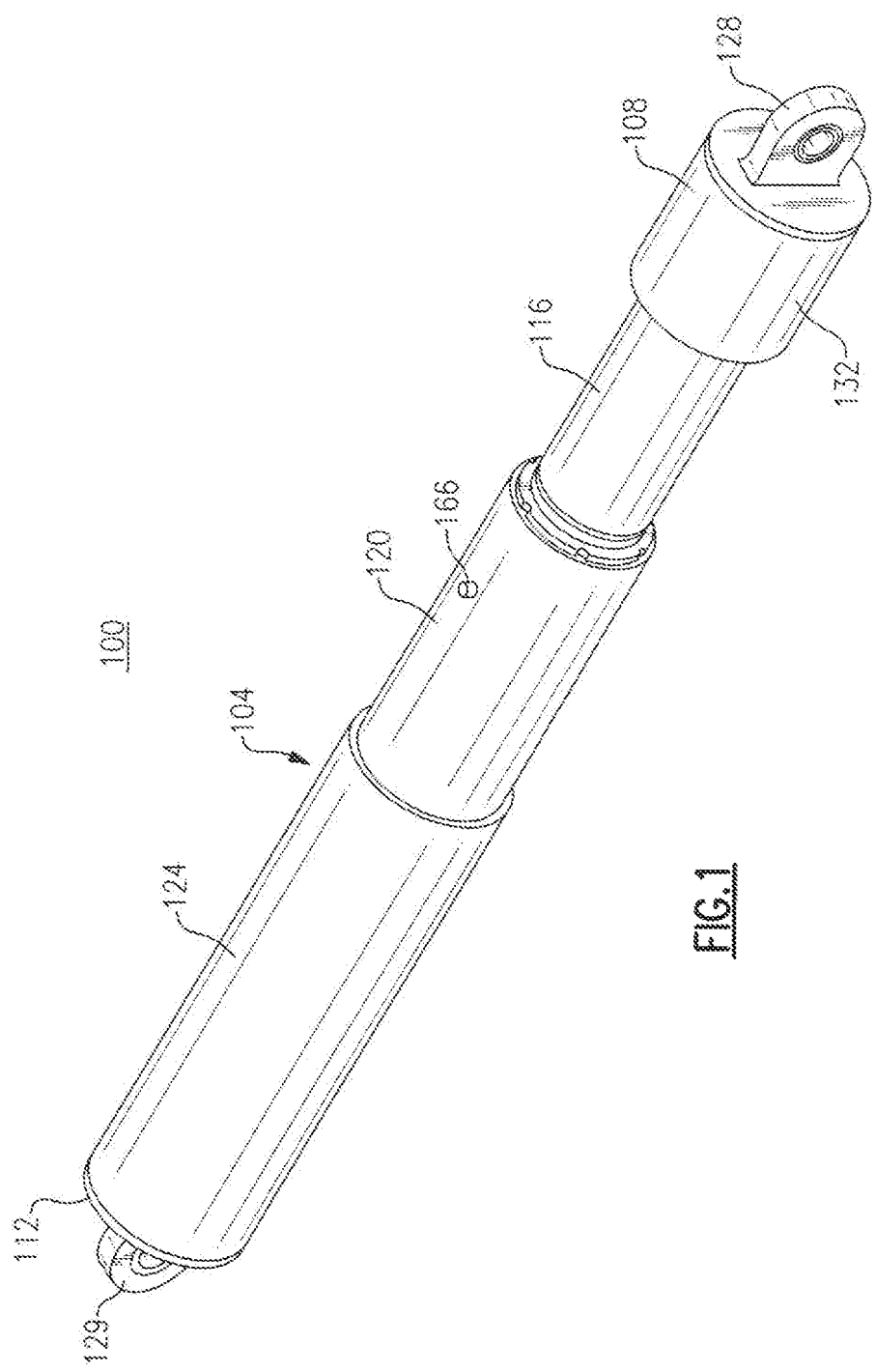
FIG. 1 is a perspective view of a damping assembly in accordance with an embodiment.
Figure 3:
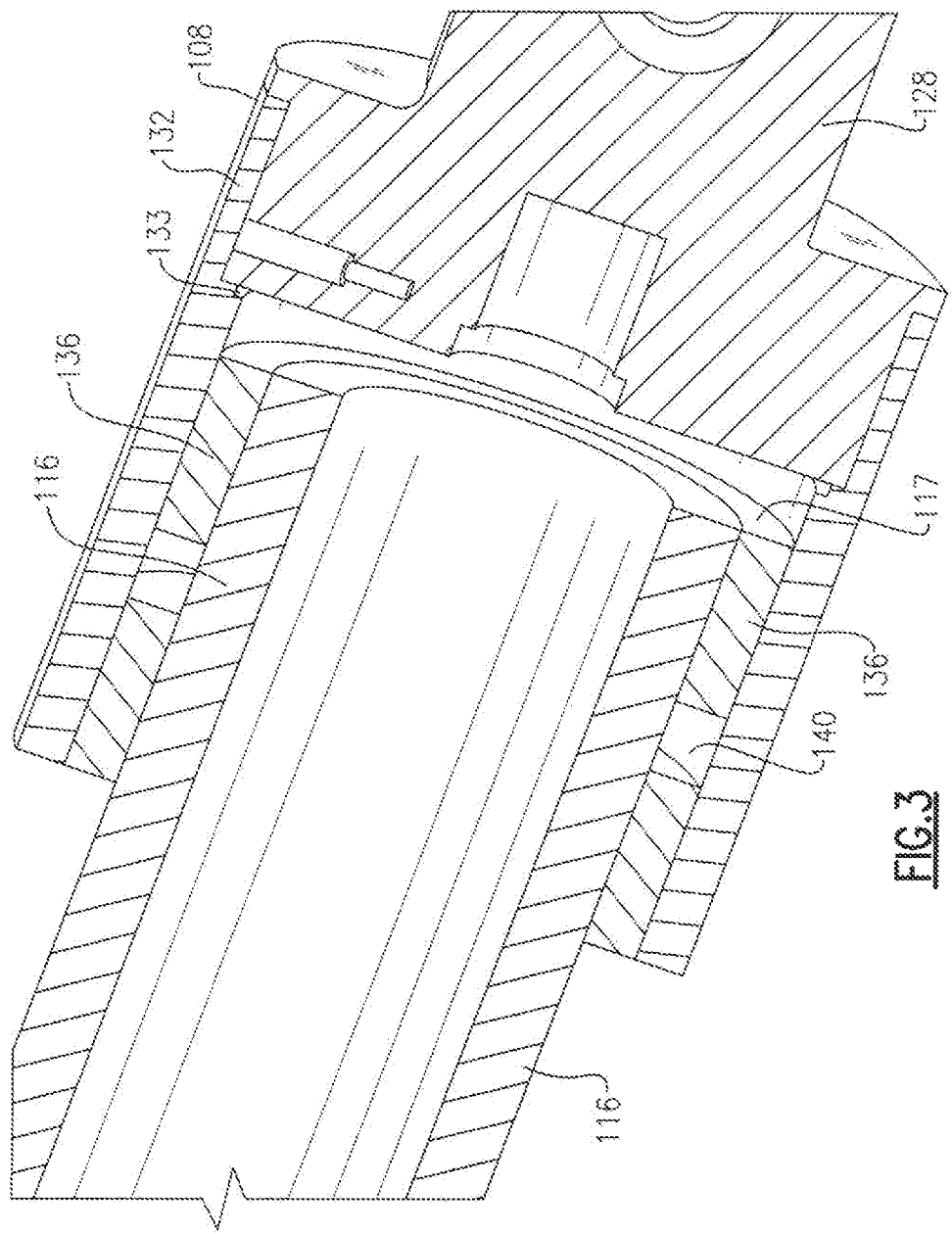
FIG. 3 is an enlarged sectional view of one end of the damping assembly of FIGS. 1 and 2.

Referring to FIG. 1, there is depicted a perspective view of a damping assembly 100 in accordance with an embodiment. The damping assembly 100 is defined by a substantially cylindrical housing 104 having opposing ends 108 and 112, and in which the housing 104 is further defined by a series of adjacent first, second and third sleeve-like sections 116, 120 and 124, respectively. According to this version, each of the sleeve portions 116, 120 and 124 are hollow and substantially cylindrical sections in which the first sleeve portion 116 is sized to fit within a hollow interior 123 of the second sleeve portion 120 and the second sleeve portion 120 is sized to fit within a hollow interior 134 of the third sleeve portion 124, thereby forming a telescoping configuration. The first sleeve section 116 is disposed adjacent to the first end 108 of the housing 104, including an end portion 132 having a clevis 128 to enable attachment of the herein described assembly 100 to a supporting structure (not shown). The end portion 132 according to this specific embodiment is made up of a tubular section that is secured to one end of the first sleeve portion 116. The end portion 132 has an interior diameter that is larger than the outer diameter of the first sleeve portion 116 to enable the end portion 132 to cover a portion of the first sleeve portion 116. With reference to FIGS. 1 and 3, the end portion 132 is fixedly secured to the end of the first sleeve portion 116 and includes a sealing member 136, such as an elastomeric O-ring or other suitable structure, which is disposed within an annular groove 140 formed within an interior surface of the end portion 132.

Referring to FIGS. 1-4 and according to this embodiment, the first sleeve portion 116 is defined by a hollow interior 127 that is sized and configured to receive a portion of a piston assembly 150, as discussed in greater detail below. One end of the first sleeve portion 116 initially extends into the hollow interior 123 of the second sleeve portion 120, wherein the extending end of the first sleeve portion 116 engages an annular shoulder 121.

The second sleeve portion 120 of the herein described damping assembly 100 includes an outer or exterior surface 122 that enables the second sleeve portion 120 to be axially movable within the hollow interior 134 of the adjacent third sleeve portion 124, the latter sleeve portion 124 extending to the second end 112 of the housing 104. Similar to the first sleeve portion 116, the second sleeve portion 120 is also defined by the substantially hollow interior 123, that retains a portion of the piston assembly 150 as well as a pair of bearing assemblies 160, 170, the latter assemblies being provided at respective ends of the second sleeve portion 120. Each of the bearing assemblies 160, 170 is commonly defined by a center opening extending therethrough as well as a necked portion 162, 172 and a corresponding inner portion 164, 174, respectively. According to this specific embodiment, the necked portion 162 of one of the bearing assemblies 160 is sized to fit within an opening formed within the annular shoulder 121 with the corresponding inner portion 164 extending into the hollow interior 123 of the second sleeve portion 120. The necked portion 172 of the remaining bearing assembly 170 extends within an end wall 122 of the second sleeve portion 120 with the corresponding inner portion 174 being sized and configured to fit against the interior surface of the end wall 122, as well as against the inner diameter of the second sleeve portion 120.

Figure 4:
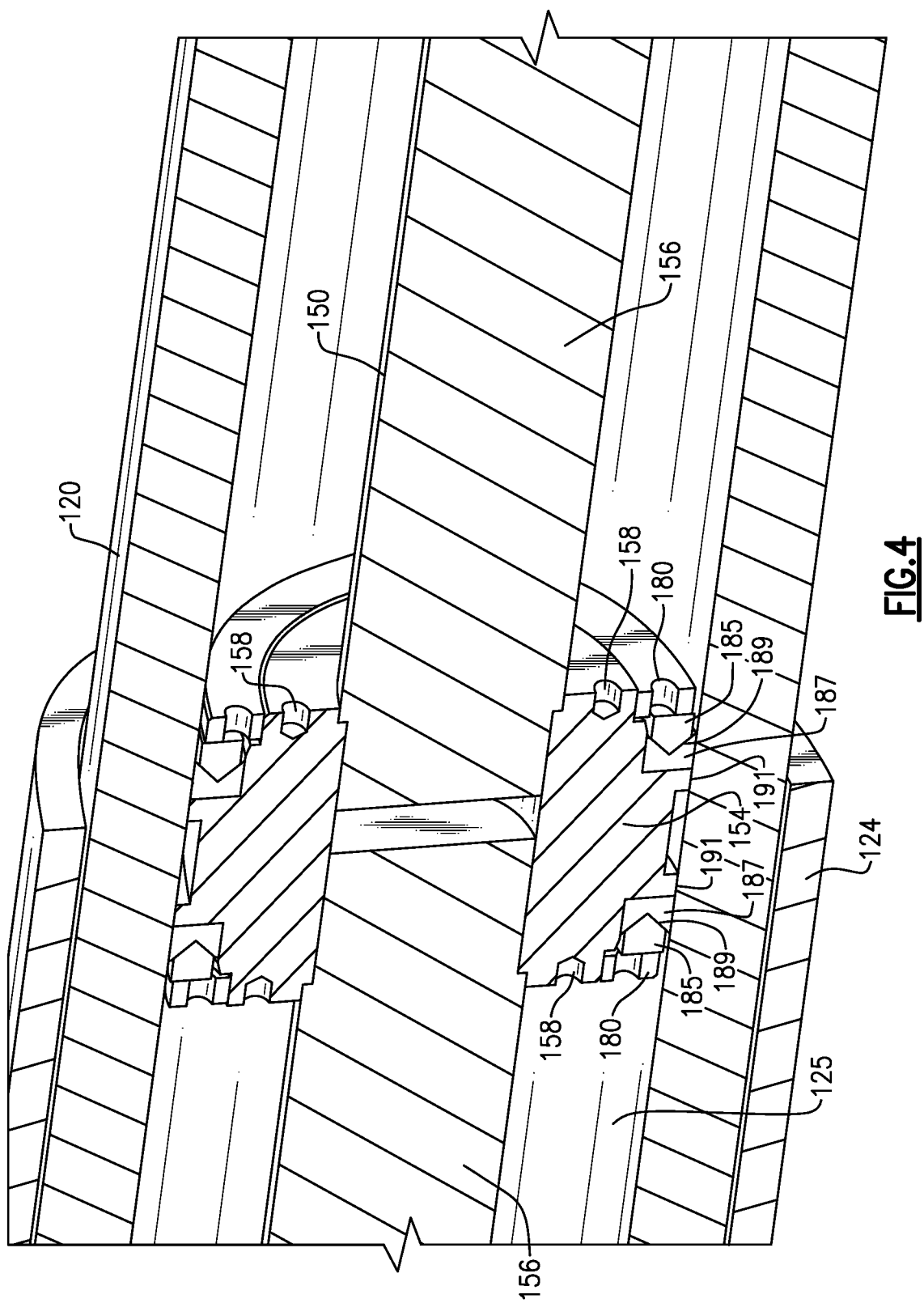
FIG. 4 is an enlarged sectioned view of the piston head of the damping assembly of FIGS. 1-3, including at least one biasing feature.

The piston assembly 150 according to this specific embodiment includes a movable piston head 154 disposed within the interior 123 of the second sleeve portion 120, as well as a cylindrical piston rod 156 that extends therethrough. One end of the piston rod 156 is fixedly attached at the end 112 of the housing 104, while the piston head 154 is intermediately disposed between the sealing assemblies 160, 170 with the hollow interior 123 of the second sleeve portion 120 being divided into a pair of hydraulic or fluidic chambers 125, 126. The piston head 154 according to this embodiment is defined by a substantially cylindrical section having a center through opening that is sized for accommodating the piston rod 156 and in which the piston rod 156 is fixedly attached to the piston head 154. According to this embodiment and as shown in FIG. 4, the piston rod 156 includes an outer annular groove that is sized to accommodate an inner radial protrusion of the piston head 154 to secure same in the fixed position. The piston head 154 includes at least one orifice 158 extending axially through the piston head 154 to permit flow of hydraulic fluid between the chambers 125, 126.

With specific reference to FIG. 4 and according to this embodiment, the piston head 154 is further defined by a pair of shoulders at each end and on opposing sides wherein the outer diameter of the piston head 154 is sized to engage the inner wall of the second sleeve member 120. A pair of sealing members 180 are disposed over the outer diameter of the piston head 154 at opposing ends, wherein the sealing members 180 are fitted in contact with the inner wall of the second sleeve portion 120. According to this embodiment and with reference to FIG. 4, each sealing ring 180 is fitted with a wedge-shaped feature or portion 185 that is configured to engage a receiving member 187 fitted within the shoulder 191 of the piston head 154. The wedge shaped feature 185 is adjacent, but initially not in direct contact with the inner wall of the second sleeve portion 120.

As noted, the piston head 154 is disposed for movement relative to the interior 123 of the second sleeve portion 120, as discussed herein. The unsecured end of the piston rod 154 extends into the hollow interior 127 of the first sleeve portion 116.

Prior to operation, the first end 108 of the herein described damping assembly 100 is attached to a portion of a supporting structure (not shown), such as a suspension bridge, using the clevis 128 or other suitable attachment means. Similarly, the opposing second end 112 of the housing 104, and more specifically the clevis 129, is similarly secured to a base or other fixed (stationary) surface (not shown). A quantity of fluid, such as hydraulic fluid, is initially added to the hollow interior 123 of the second sleeve portion 120 through a sealable fill port 166 to substantially fill the sealed fluidic chambers 125, 126.

Figure 2:
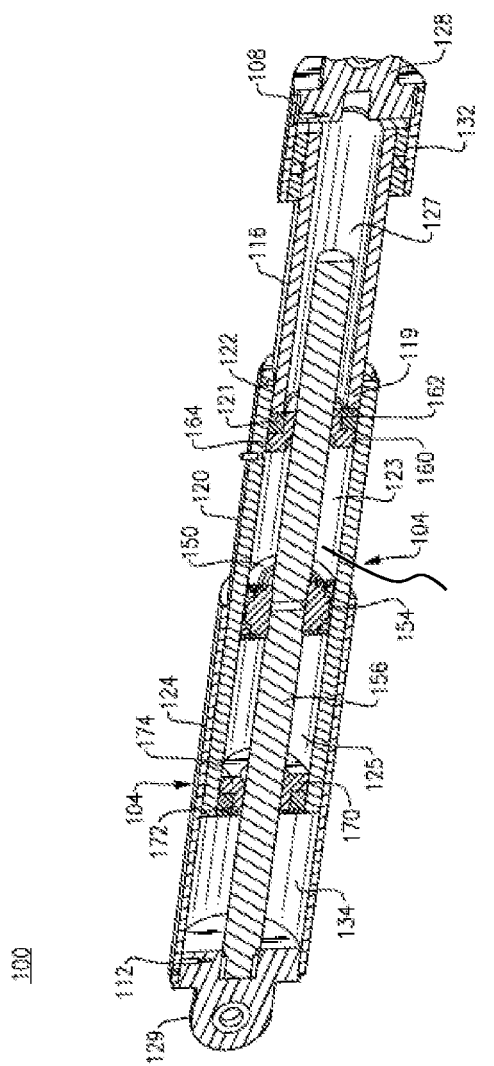
FIG. 2 is the perspective view of the damping assembly of FIG. 1, shown in section.

In operation and in an initially unloaded position, which is depicted in FIG. 2, the first sleeve portion 116 of the herein described damping assembly 100 extends outwardly relative to the second sleeve portion 120, with the second sleeve portion 120 also partially extending outwardly (i.e., toward the first end 108 of the housing 104) in relation to the fixed third sleeve portion 124.

The first end 108 of the herein described assembly 100, including the first sleeve portion 116, is permitted to move in relation to the remainder of the damping assembly 100 upon input of a load by the attached structure. As shown in FIGS. 1-4 and upon initial application of a load, the first end 108, including the end portion 132, is caused to translate toward the second end 112 of the housing 104 until an interior wall surface 133 within the end portion 132 is moved into contact with the outer end 117 of the first sleeve portion 116. Upon this engagement, each of the end portion 132 and the first sleeve portion 116 are moved unitarily toward the second end 112 of the housing 104.

Axial movement of the first sleeve portion 116 in response to the applied load further causes engagement between the inner end 119 of the first sleeve portion 116 and the annular shoulder 121 of the second sleeve portion 120. This engagement further creates axial movement of the second sleeve portion 120 within the hollow interior of the third sleeve portion 124. Though this movement creates pressure on the retained hydraulic fluid, there is no initial movement of the piston head 154, because the wedge-shaped feature 185 of the sealing members 180 are caused to bear against the inner wall of the second sleeve portion 120, creating a biasing force that prevents movement of the piston head 154 until a predetermined pressure force is first realized.

When the pressure force is realized and in addition to the movement of the second sleeve portion 124 within the interior of the third sleeve portion 124, the piston head 154 is caused to move axially within the confines of the interior 123 of the second sleeve portion 120 along the piston rod 154 and create damping as contained hydraulic fluid is caused to move between the defined and sealed hydraulic chambers 125, 126 of the hollow interior 123 of the second sleeve portion 120 through the defined orifice in the piston head 154. Alternatively, an annular gap (not shown) can be provided between the exterior surface of the piston head 154 and the interior diameter of the second sleeve portion 120 in order to enable fluidic movement between the defined chambers 125, 126.

When the pressure force is sufficient to the biasing force produced by the sealing assembly of the piston head 154, the piston head 154 is further caused to move toward the end 112 of the assembly 100 along with the second sleeve portion 120. When the load is no longer acting on the assembly 100, the pressure of the hydraulic fluid causes the piston 154 to be restored to its original position with the first, second and third sleeve portions 116, 120, 124, respectively, and the end portion 132 further being moved to their original positions. Optionally, a biasing spring (not shown) could be introduced into the interior 134 of the third sleeve portion 124 to assist in reverting the assembly 100 to its original position once the load is no longer actively engaged therewith.

The herein described damping assembly 100 is caused to move contained fluid between the connected hydraulic chambers 125, 126 on each side of the piston head 154 based on movement of the retained piston head 154. In one version, the piston head 154 can include at least one axial orifice (not shown) extending therethrough and/or the hydraulic fluid can alternatively move around the exterior of the piston head 154 to create a suitable damping force as the piston head 154 is moved axially under the application of a minimum load within the interior of the second sleeve portion 120.

As noted and according to this specific embodiment, the piston head 154 is not caused to translate initially within the interior of the second sleeve portion 120, based at least in part on a biasing force provided by the sealing members 180 that each are caused to bear against the interior surface of the second sleeve portion 120 due to the wedge-shape of the sealing member 180. As noted, the sealing members 180 are suitably configured such that the piston head 154 cannot move until a predetermined axial distance/load is first imparted to the damping assembly 100. It should be noted that other suitable techniques may be alternatively employed for this latter purpose, such as a biased axial orifice (not shown) or a structural feature such as a wiper assembly (not shown) that can be disposed in relation to the piston head 154.

In either case and in terms of principle, the biasing feature(s) provided functionally maintains the position of the piston head 154 until receipt of a predetermined load to overcome the biasing force, which then permits movement of the piston head 154 within the second sleeve portion 120 and corresponding axial movement of the second sleeve portion 120 relative to the third sleeve portion 124.

It will be understood that other suitable variations to the described embodiment are possible. For example and according to an alternative version (not shown), a plurality of hydraulic dampers can be disposed in either parallel or axial (serial) relation to one another within a defined housing (s) and in which all or some of the arranged dampers are not engaged until a predetermined force is applied or a predetermined gapping distance has been exceeded before active damping of the structure commences. Still further, the sealing member or other means used for biasing the piston head 154 can be designed in an tuned manner based on the types of loads that would be imparted to the structure. In another alternative embodiment and in lieu of a biasing spring, the hollow interior of the third sleeve portion 124 can be filled or at least partially filled with an elastic material (not shown) configured to act as an accumulator.

PARTS LIST FOR FIGS. 1-4

100 damping assembly
104 housing, assembly
108 first end
112 second end
116 first sleeve portion
117 end surface, first sleeve portion
119 end surface, first sleeve portion
120 second sleeve portion
121 annular shoulder
122 end wall, second sleeve portion
123 hollow interior, second sleeve portion
124 third sleeve portion
125 hydraulic or fluidic chamber
126 hydraulic or fluidic chamber
127 interior, first sleeve portion 128 clevis
129 clevis
130 attachment hole
132 end portion
133 interior wall surface, end portion
134 hollow interior, third sleeve portion
136 sealing member
140 annular groove
150 piston assembly
154 piston head
156 piston rod
158 orifices
160 bearing assembly
162 necked portion
164 inner portion
166 fill port
170 bearing assembly
172 necked portion
174 inner portion
180 sealing members/sealing rings
185 wedge shaped feature or portion
187 receiving member
189 groove
191 shoulders Though only a single embodiment of a damping assembly with a gapping feature has been described in detail herein, it will be readily apparent to any person of sufficient skill that a varied number of modifications and variations can be derived based on the inventive concepts described herein and within the scope of this disclosure, including each of the following appended claims.

The invention claimed is:

1. A damping assembly for use with a supporting structure, said damping assembly comprising:
a housing having a first end configured for attachment to the structure and an opposing second end configured for attachment to a fixed surface, the housing comprising:
a first sleeve section at the first end of the housing, the first sleeve section having a hollow interior;
a second sleeve section having a hollow interior that is sized and configured to receive at least an axial portion of the first sleeve section; and
a third sleeve section having a hollow interior sized and configured to receive at least an axial portion of the second sleeve section, each of the first, second and third sleeve sections being defined by a cylinder having an outer diameter and an inner diameter in which the second sleeve section telescopically extends from the third sleeve section and the first sleeve section telescopically extends from the second sleeve section, in which the outer diameter of the first sleeve section substantially corresponds with the inner diameter of the second sleeve section and the inner diameter of the second sleeve section substantially corresponds with the outer diameter of the third sleeve section, each of the first and second sleeve portions being translatably movable; and
a viscous damper comprising:
a piston rod attached to the second end of the housing and extending through the interiors of the third sleeve section, the second sleeve section, and at least a portion of the first sleeve section; and
a piston head fixedly attached to the piston rod within the second sleeve section in which respective ends of the first and second sleeve sections include a bearing assembly defining hydraulic fluid chambers on opposing sides of the piston head, and
at least one biasing element disposed over the exterior of the piston head and in contact with the inner diameter of the second sleeve section, the at least one biasing element being configured to create a force that delays translatable movement of the second sleeve section until the first sleeve section has first moved a predetermined distance within the second sleeve section toward the piston head.

2. The damping assembly of claim 1, in which each bearing assembly includes at least one sealing member.

3. The damping assembly of claim 1, wherein the second end of the housing includes an accumulator chamber defined within the hollow interior of the third sleeve section of the assembly housing.

4. The damping assembly of claim 1, in which the at least one biasing element is disposed on the exterior of the piston head and includes at least one wedge-shaped member disposed in relation to the exterior of the piston head and a sealing ring, the at least one wedge-shaped member being configured to engage the interior wall of the second sleeve section.

5. The assembly of claim 1, further comprising an end portion disposed over an axial portion of the first sleeve portion at the first end of the housing and attached to an end fitting, the end portion being configured to move translatably with the first sleeve portion upon application of a load.

6. The assembly of claim 5, in which the end portion has an interior wall initially axially spaced from an end surface of the first sleeve section.

7. A method for damping a structure, the method comprising the steps of:
attaching a damping assembly to a structure under load, the damping assembly including a first sleeve section that telescopically extends from a second sleeve section and in which the second sleeve section telescopically extends from a third sleeve section, each of the first, second and third sleeve sections commonly defined by a cylinder having an inner diameter and an outer diameter in which the outer diameter of the first sleeve section substantially corresponds with the inner diameter of the second sleeve section and the outer diameter of the second sleeve section substantially corresponds with the inner diameter of the third sleeve section, the damping assembly further including a viscous damper retained in the second sleeve section, the viscous damper including a piston head fixedly disposed on a piston rod fixedly attached to the second end of the housing, in which respective ends of the first and second sleeve sections include bearing assemblies that define hydraulic fluid chambers formed on opposite sides of the piston head;
translatably moving the first translatable sleeve section within the interior of the second sleeve portion upon application of a load and compressing hydraulic fluid contained in one of the hydraulic fluid chambers; and
the compressed hydraulic fluid engaging the viscous damper having at least one biasing element that delays the second sleeve section from moving relative to the piston head until the first sleeve section has moved beyond a predetermined distance.

8. The method of claim 7, in which the at least one biasing element includes at least one wedge-shaped member disposed in relation to the exterior of the piston head, the at least one wedge-shaped member being configured to engage the interior wall of the second sleeve section when the first sleeve section is moved toward the piston head.

9. The method of claim 8, in which said at least one wedge-shaped member is disposed on opposite ends of the piston head.

10. The method of claim 9, wherein the viscous damper further includes a sealing ring disposed in relation to the exterior of the piston head and the at least one wedge-shaped member, the sealing ring being configured and sized to engage the inner diameter of the second sleeve section.

11. The method of claim 9, wherein the piston head includes at least one axial orifice.

12. The method of claim 7, further comprising:
disposing an end portion disposed over an axial portion of the first sleeve portion at the first end of the housing and attaching the end portion to an end fitting, the end portion being configured to move translatably with the first sleeve portion upon application of a load.

13. The method of claim 12, wherein the end portion is configured with an interior wall that is initially axially spaced from an end surface of the first sleeve section, wherein under load the end fitting and the end portion first move to close the axial spacing before causing the first sleeve portion to translatably move.

\* \* \* \* \*